United States Patent [19]

Skewis

[11] 4,156,557
[45] May 29, 1979

[54] DUAL REAR VIEW MIRROR UNIT
[76] Inventor: William A. Skewis, P.O. Box 251, Sequim, Wash. 98382
[21] Appl. No.: 906,936
[22] Filed: May 18, 1978
[51] Int. Cl.$^2$ .............................................. G02B 5/08
[52] U.S. Cl. .................................. 350/307; 350/304; 248/485
[58] Field of Search ....................... 350/304, 299, 307; 248/480, 485, 486

[56] References Cited
U.S. PATENT DOCUMENTS

| | | | |
|---|---|---|---|
| 2,413,894 | 1/1947 | Sorenson | 350/304 |
| 2,708,086 | 5/1955 | Prutzman | 350/304 |
| 2,764,913 | 10/1956 | Green | 350/304 |
| 3,644,021 | 2/1972 | Hamby | 350/304 |

Primary Examiner—Jon W. Henry
Attorney, Agent, or Firm—Francis Swanson

[57] ABSTRACT

A dual rear view mirror unit for motor vehicles is disclosed. The unit comprises a mounting frame having an upper and a lower rear view mirror thereon. Each of the mirrors is independently adjustable. The upper mirror and lower mirror are positioned so as to define a substantial gap between them. This allows the operator of the motor vehicle unobstructed lateral vision. The lower mirror is mounted on the frame so that its upper edge is beneath the lateral line of vision of the operator. Likewise the upper mirror is mounted on the frame so that its lower edge is substantially above the said lateral line of vision. With this construction the upper edge of the upper mirror protrudes substantially above the cab of the truck. The upper mirror is tilted so that its upper end inclines toward the rear of the truck. This substantially aids in the dissipation of fog and rain which may accumulate on the upper mirror's surface.

The unit is illustrated for use on a large truck where problems of water and dirt thrown up by the wheels of both the mirror-equipped vehicle and oncoming vehicles is particularly acute.

10 Claims, 5 Drawing Figures

U.S. Patent
May 29, 1979
4,156,557
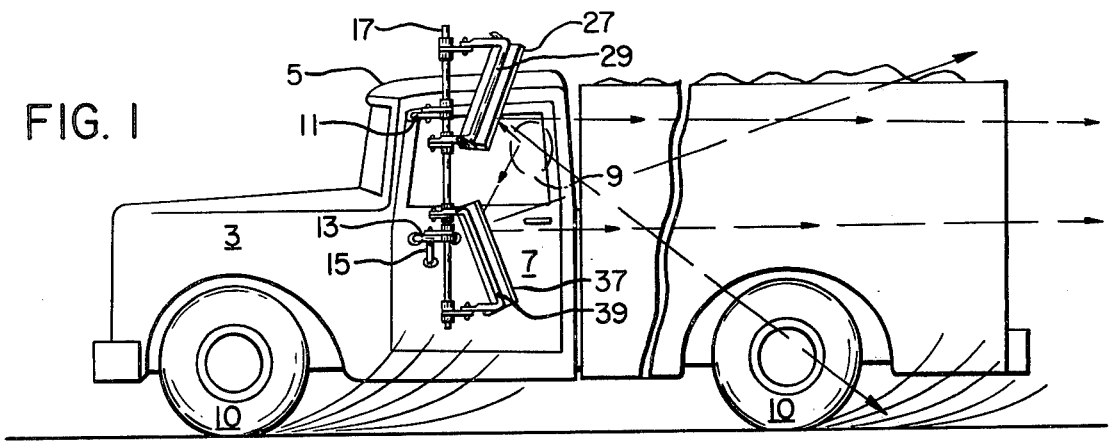
FIG. 1
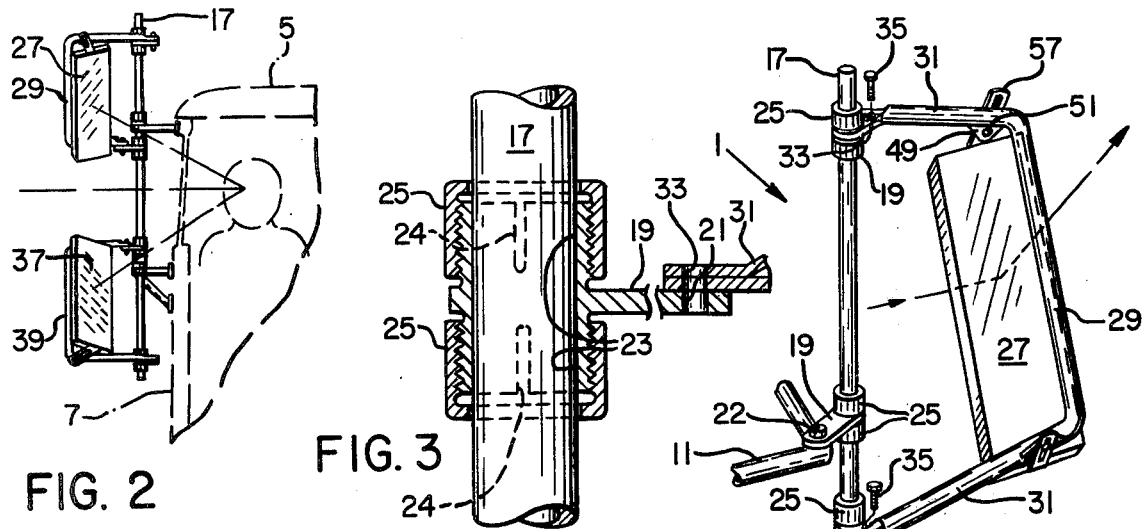
FIG. 2
FIG. 3
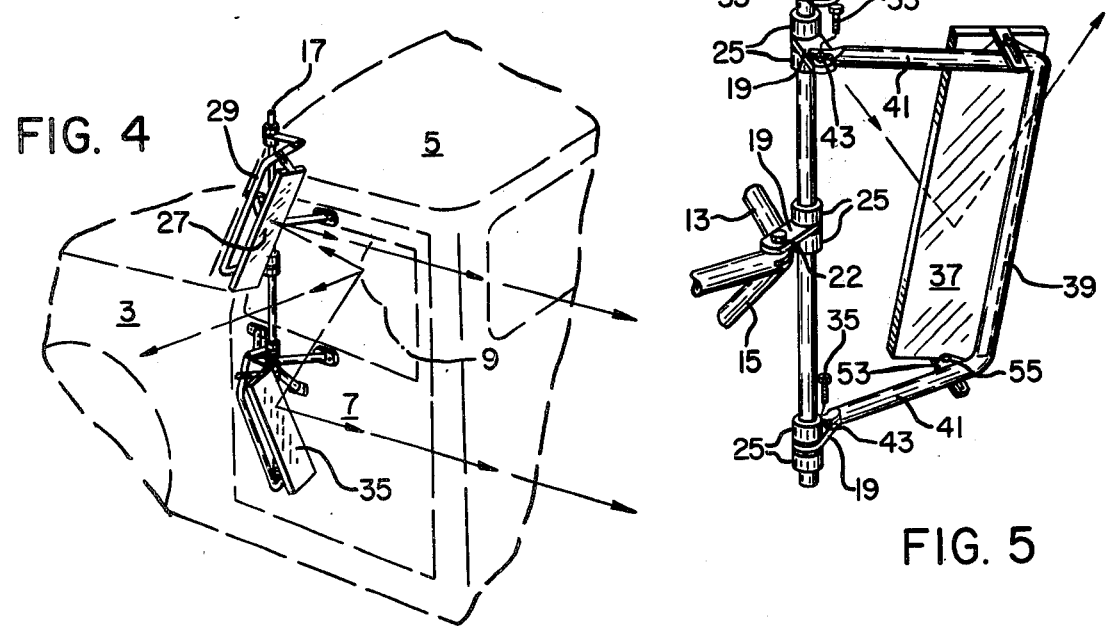
FIG. 4
FIG. 5

DUAL REAR VIEW MIRROR UNIT

DESCRIPTION OF THE PRIOR ART

Numerous dual mirror constructions exist in the prior art. Some examples include the following U.S. Pat. Nos. 2,413,894 to Sorenson, 2,708,086 to Prutzman, 2,764,913 to Green, 3,644,021 to Hamby, 4,025,173 to Schmaedeke. Generally in these prior art units the mirrors are mounted on the vehicle in a manner such that fog, rain and dirt tend to collect on them. Road water or dirt and other objects thrown up by the wheels of the vehicle can accumulate on the mirror surface so that adequate rear vision is badly impaired or destroyed. In these prior art constructions the mirrors are mounted so that the upper mirror is well below the top of the vehicle cab. None have the advantage of substantially unobstructed visibility of nearly 160°-180° on a vertical plane to the rear of the vehicle.

SUMMARY OF THE INVENTION

It is a primary object of this invention to provide a dual rear view mirror unit for a motor vehicle which provides great lateral vision to the operator while simultaneously providing substantially unobstructed rear vision.

A further object of the invention is to provide a dual mirror unit having an upper mirror and lower mirror wherein the upper mirror minimizes deposits of fog, rain, dirt and other matter on its mirror surface.

A further object of the invention is to provide means for achieving a panoramic rear view which overlaps in each mirror and may approach 160°-180° in a vertical plane at the rear of the truck.

A further object of the invention is to provide a mirror unit wherein the upper mirror projects substantially above the top of the vehicle cab and wherein the top of the upper mirror is inclined toward the rear of the vehicle.

A further object of the invention is to provide a dual mirror system for motor vehicles having particular mounting brackets with individually adjustable double collets to provide for independent adjustment of each mirror.

Other objects and advantages of my invention will be apparent to those skilled in the art with reference to the accompanying drawing and specification.

BRIEF DESCRIPTION OF THE DRAWINGS

FIG. 1 is a side elevation of a truck showing the dual mirror unit of this invention mounted thereon.

FIG. 2 is a rear elevation showing the mirror unit, the operator's line of vision and the truck cab in phantom.

FIG. 3 is a sectional view of the double collet collars.

FIG. 4 is a perspective view of the truck cab and mirror unit. The cab is shown in phantom.

FIG. 5 is a perspective view of the invention showing the details of mirror mounting.

DETAILED DESCRIPTION

Referring now to the drawings, FIG. 1 shows a vehicle, in particular a truck, which includes the dual rear view mirror unit described herein. The mirror unit includes a frame referred to generally by the numeral 1. The frame 1 is mounted on truck 3 which has a cab 5, a door 7, a truck window 9, and wheels 10. Frame 1 includes a pair of upper mounting arms 11 mounted near the top edge of the truck cab door 7 of truck 3 and above window 9. A pair of lower mounting arms 13 are secured to the cab door 5 below the window 9. Both the upper arms 11 and lower arms 13 extend outward from the vehicle to give the operator a substantially unobstructed view to the rear. A support member 15 extends diagonally from lower arms 13 and connects to door 7 of truck 3 as illustrated. A vertical shaft 17 is secured to the outer end of the upper and lower arms 11 and 13 respectively by adjustable double collet mounting collars 19. Mounting collars 19 define a hole 21 and attach to the outer ends of arms 11 and 13 with pivot pins 22. Each mounting collar embodies the double collet construction of FIG. 3 which includes, in addition to hole 21, an elongate threaded tube section 23 which contain vertical slots 24 and two threaded clamping nuts 25.

Shaft 17 extends substantially above upper arms 11 and substantially beneath lower arms 13. The distance of these extensions is approximately two-thirds the length of the mirrors to be mounted on the shaft 17. Upper mirror 27 is mounted on a U-shaped bracket 29 which has a plurality of elongate legs 31 each of which defines a pivot hole 33. Legs 31 of bracket 29 are secured through holes 33 with bolts 35 to double collet mounting collars 19. Mounting collars 19 are of the double collet construction shown in FIG. 3 and as previously described include threaded tube section 23 and clamping nuts 25. Lower mirror 37 is likewise mounted in a similar fashion to U-shaped bracket 39 which has elongate legs 41 defining mounting holes 43. Legs 41 attach to mounting collars 19 with bolts 35 as described above.

Upper mirror 27 is pivotally mounted on bracket 29 by attachment to ears 49 with bolts 51 which extend from bracket 29. Lower mirror 37 is likewise pivotally secured to bracket 39 by attachment to ears 53 thereon with bolts 55. Ears 49 and 53 each include an elongate slot 57 which provides for tilting adjustment away from the vertical axis defined by shaft 17.

Referring again to FIG. 1, it is seen that upper mirror 27 is tilted with respect to vertical shaft 17 so that its upper edge is inclined toward the rear of truck 3. The surface of the mirror is thus protected from falling rain. This inclined position of mirror 27 greatly reduces the tendency of fog to condense on the mirror surface. Wheels of passing vehicles or truck wheels 10 throw up significant amounts of water, dirt and road debris. Because mirror 27 is positioned so that it protrudes substantially above cab 5, the tendency of this material to lodge on the mirror's reflective surface is greatly reduced. It is also seen that this construction and method of mounting positions the lower edge of upper mirror 27 substantially above the lateral line of vision of the operator of truck 3. Also, the upper end of lower mirror 37 is positioned substantially below the lateral line of vision of the vehicle operator.

Each mirror can be individually adjusted to suit the individual operator by adjustment of double collet collars 29. Loosening clamp nuts 25 on each of the collars will permit the operator to move the mirror freely. Once the desired position of each mirror is located, nuts 25 are tightened down and the mirrors are secured.

Because of the presence of vertical slots in tubes 23, tightening of nuts 25 will cause the walls of tube section 23 to tighten against shaft 17 and seat tightly in place. Upper mirror 27 will then give a view of both the rear of truck 3 and the ground below and well beyond it. Lower mirror 37 will give a view of both rear of the truck and a substantial amount of the space above and behind it. This results in an overlapping view of a great portion of the truck 3 and the space around it. With careful adjustment this would give about 160°-180° visibility in a vertical plane at the rear of the truck.

Actual field tests with a large truck have shown that the positioning of the upper mirror in the manner described above eliminates virtually all of the problems encountered from rain, fog, moisture and debris thrown up by the wheels of the vehicle. Testing of conventional dual mirror systems in heavy rain and adverse conditions has shown that the mirrors become virtually useless in a matter of minutes whereas the disclosed invention remained usable for indefinite periods of time.

It is seen that the operator may optionally use only the lower mirror 37 during good weather, then use both mirrors during periods of inclement weather or bad road conditions.

Having disclosed my invention in the drawings and described it in detail in the specification, it will be apparent to those skilled in the art that many modifications could be made without departing from the true spirit and scope of the invention. I claim as my invention all such modifications as fall within the scope and equivalence of the appended claims.

I claim:

1. A vertically adjustable, dual rear view mirror unit for mounting on the door of a motor vehicle comprising:
   a mounting arm secured to the motor vehicle door and operatively attached to a vertical oriented mirror support laterally spaced from the side door;
   a first lower mirror mounting bracket supporting a mirror thereon, the first bracket secured to the vertically oriented mirror support so that the upper terminating edge of the mirror is below the lateral line of vision of the operator of the vehicle to provide unobstructed lateral vision and unobstructed rear vision;
   a second mirror mounting bracket supporting a second mirror secured to the vertical mirror support spaced above the upper terminating edge of the first mirror so that the lower terminating edge of the upper mirror is above the lateral line of vision of the operator of the vehicle to provide unobstructed lateral vision and unobstructed rear view.

2. The mirror unit of claim 1 wherein the first and second mirrors are vertically adjustable relative to one another and to the vertically oriented mirror support.

3. The mirror unit of claim 1 wherein the space between the first and second mirrors defines a substantially unobstructed lateral field of vision by the operator of the vehicle.

4. The mirror unit of claim 1 wherein the upper edge of the upper mirror is tilted away from the vertically oriented mirror support to prevent condensation of fog on the surface of the mirror and deposit of raindrops on the surface of the mirror during a rainstorm.

5. The mirror unit of claim 1 wherein the first and second mirror mounting brackets are U-shaped with generally parallel legs;
   each of the U-shaped brackets pivotally secured at their respective leg ends to vertical adjusted means on the vertically oriented mirror support, and;
   the legs of each of the U-shaped brackets including laterally extending ears to which each of the mirrors is pivotally secured.

6. A vertically adjustable dual rearview mirror unit for mounting on the door of a vehicle comprising:
   a vertical shaft;
   a first mirror mounting bracket on the vertical shaft;
   a second mirror mounting bracket on the vertical shaft positioned substantially below the first bracket;
   an elongated upper mirror angularly attached to the first bracket so the upper end is tilted away from the vertical shaft;
   a lower mirror on the second bracket, the mirrors mounted in extended spaced apart relation so that a substantially unobstructed line of vision between said mirrors is provided;
   vertical mirror positioning means operatively connected to the first and second mirror brackets and to the vertical shaft;
   and means for mounting the unit on the vehicle door.

7. Apparatus according to claim 6 wherein the vertical mirror positioning means comprises double collet means.

8. Apparatus according to claim 7 wherein the collet means includes an elongate tubular section defining elongate slots and threads at each end thereof;
   and clamping nuts operatively connected to the threads.

9. A vertically adjustable rearview mirror unit for mounting on a vehicle having an operator cab, a door and window, the unit comprising:
   mounting means on the door;
   a vertical mirror support shaft on the mounting means;
   plural vertical mirror positioning collet means on the shaft;
   a U-shaped upper mirror mounting bracket having an elongate upper mirror thereon, the upper end of said mirror spaced substantially outward from the mounting bracket relative to the lower end of said mirror so that the upper mirror is inclined at a substantial angle relative to the vertical shaft, the upper mounting bracket operatively connected to the plural collet means;
   a U-shaped lower mirror mounting bracket having an elongate lower mirror thereon, the lower mounting bracket operatively connected to the plural collet means;
   the upper mirror and lower mirror positioned along the vertical shaft in substantial spaced apart relation to define a relatively unobstructed line of vision laterally from the vehicle.

10. The apparatus of claim 9 wherein the inclined upper mirror protrudes at least partially above the top of the operator cab.

* * * * *